June 5, 1956     A. L. JENNY ET AL     2,749,487
TANTALUM ELECTROLYTIC CAPACITOR
Filed May 11, 1953
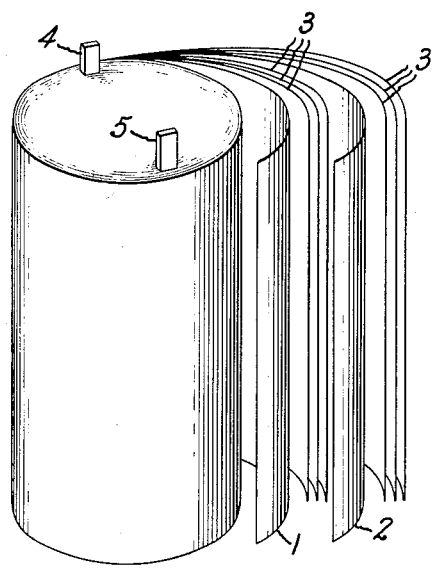
CONTAINS MIXTURE OF GLYCOL, WATER AND POTASSIUM NITRITE.
Inventors:
Alfred L. Jenny,
Donald H. Stephenson,
by Gilbert P. Tarleton
Their Attorney.

United States Patent Office 2,749,487
Patented June 5, 1956

2,749,487
TANTALUM ELECTROLYTIC CAPACITOR

Alfred L. Jenny and Donald H. Stephenson, Glens Falls, N. Y., assignors to General Electric Company, a corporation of New York Application May 11, 1953, Serial No. 354,043

4 Claims. (Cl. 317—230)

The present invention relates to a tantalum electrolytic capacitor and has as its principal object the provision of an electrolytic capacitor for low voltage applications over a wide range of temperatures. More specifically the invention is concerned with a low voltage tantalum electrolytic capacitor having a high degree of chemical and electrical stability at elevated temperatures and being operable over a wide range of temperatures down to at least —55° C. without substantial loss in capacitance.

In accordance with the present invention there has been provided an electrolytic capacitor comprising tantalum electrodes and an electrolyte consisting of a solution of potassium nitrite in a mixture of water and ethylene glycol in such proportions that the freezing point of the mixture is below —55° C. In general the electrolyte will consist, by weight, of from 28 to 35 per cent potassium nitrite, from 28 to 35 per cent distilled water and from 30 to 43 per cent ethylene glycol. Preferred electrolytes within the scope of the present invention are those containing, by weight, from 33 to 35 per cent potassium nitrite, 33 to 35 per cent water and from 30 to 34 per cent ethylene glycol. It has been found that this electrolyte composition has a freezing point below —55° C. and a boiling point above 110° C. thereby permitting safe operation of capacitors containing such electrolyte at temperature ranging from a —55° C. to +85° C. Furthermore, the electrolyte has a specific resistivity in the neighborhood of about 10 ohm centimeters at room temperature and less than 1000 ohm centimeters at temperatures down to —55° C. Tantalum electrolytic capacitors containing the electrolyte are stable both chemically and electrically up to 85° C. with or without rated voltage applied and retain from 60 to 70 per cent of their room temperature capacitance at —55° C. when measured at 120 cycles per second.

The accompanying drawing illustrates a roll type capacitor as an example of an electrolytic capacitor employed in the practice of the present invention.

The capacitor shown in the drawing comprises cooperating tantalum armatures or electrodes 1 and 2 in the form of a thin foil. The electrodes advantageously, but not necessarily, may be etched and formed or oxidized in accordance with known practices.

Between the armatures or electrodes is a spacer 3 consisting of one or more sheets of kraft paper or other suitable spacing material which is impregnated with the electrolyte composition. Terminal connectors 4 and 5 are provided for electrical contact respectively with foils or electrodes 1 and 2. After impregnation with the electrolyte composition the assembly is put into a suitable container (not shown) which is sealed and provided as usual with external terminals electrically connected to conductors 4 and 5.

Heretofore various electrolytes comprising solutions in mixtures of polyhydric alcohols, such as ethylene glycol, and water have been used or proposed for use in electrolytic capacitors. The present electrolyte differs from the prior electrolytes in its exceptionally low specific resistivity at both normal and sub-normal temperatures. Low voltage capacitors containing the present electrolyte retain a high percentage, usually at least 60 to 70 per cent, of their room temperature capacitance at —55° C. when measured at 120 cycles per second. The specific resistivity values for the electrolyte employed in the practice of the present invention and various prior electrolytes are set forth in Table I, while Table II contains the results of tests on capacitors containing the various electrolytes as regards the change in capacitance of the various capacitors between room temperature and a —55° C. The compositions of the electrolytes are given in Table III.

TABLE I

Effect of temperature change on electrolyte resistivity

| Electrolyte Number | Specific Resistivity (ohm cm.) | |
|---|---|---|
| | at 25° C. | at —55° C. |
| A | 232.0 | 25,000 |
| B | 52.5 | 7,107 |
| C | 110.0 | 14,317 |
| D | 189.5 | 72,100 |
| E | 96.0 | 4,377 |
| F | 87.0 | 3,862 |
| G | 54.0 | 7,220 |
| H | 56.0 | 11,850 |
| I | 45.0 | 7,850 |
| J | 12.0 | 560 |
| K | 11.3 | 470 |

TABLE II

Effect of electrolyte resistivity on low temperature characteristics of 10 volt D. C. 30 mfd. etched foil polar tantalytics

| Electrolyte Number | Percent of Room Temp. Cap. Retained at —55° C. | |
|---|---|---|
| | 120 C. P. S. | 1000 C. P. S. |
| A | 27.0 | 0.2 |
| B | 60.0 | 33.0 |
| C | 52.0 | 16.0 |
| D | 21.0 | 4.0 |
| E | 70.0 | 45.0 |
| F | 69.0 | 37.0 |
| G | 66.0 | 33.0 |
| H | 65.0 | 31.0 |
| I | 71.0 | 37.0 |
| J | 70.0 | |
| K | 70.0 | 52.0 |

TABLE III

| Designation | Composition by Weight |
|---|---|
| A | 60.3% Ethylene glycol, 36.2% water, 3.5% ammonium borate. |
| B | 50.4% Ethylene glycol, 35.4% water, 14.2% ammonium succinate. |
| C | 57.9% Ethylene glycol, 38.6% water, 2.45% ammonium hydroxide (28%), 1.05% Formic acid (88%). |
| D | 54.0% Ethylene glycol, 36% water, 10% sodium borate. |
| E | 59.4% Ethylene glycol, 39.6% water, 1.0% conc. sulfuric acid. |
| F | 49.2% Ethylene glycol, 32.5% water, 18.3% conc. phosphoric acid. |
| G | 45.3% Ethylene glycol, 31.8% water, 12.8% ammonium succinate, 10% formamide. |
| H | 61% Ethylene glycol, 30.5% water, 8.5% lithium chloride. |
| I | 54.5% Ethylene glycol, 36.3% water, 9.2% lithium chloride. |
| J | 33⅓% potassium nitrite, 33⅓% water, 33⅓% ethylene glycol. |
| K | 34.8% potassium nitrite, 34.8% water, 30.4% ethylene glycol. |

From the result set forth in the above tables it will be noted that the potassium nitrite electrolytes not only have the lowest specific resistivity both at room temperature and at —55° C., but also show the smallest increase in resistivity between room temperature and −55° C. In addition, capacitors containing the potassium nitrite electrolytes retain a high percentage of their room temperature capacitance at −55° C.

While the potassium nitrite electrolyte is quite alkaline, it appears to have no adverse effect on the tantalum electrodes. However, certain electrode metals such as aluminum should not be employed in combination with the potassium nitrite electrolyte. It has been found that an oxidized aluminum foil deteriorates completely in about 15 hours at 85° C. when immersed in the potassium nitrite solution.

An electrolyte having a very low specific resistivity at −55° C. consists by weight of 34.8 per cent potassium nitrite, 34.8 distilled water and 30.4 ethylene glycol. This electrolyte identified herein as K has a specific resistivity at 25° C. of 11.3 ohm centimeters and at −55° C. of 470 ohm centimeters. Its boiling point is between 119° C. and 120° C. and it has a pH of approximately 9.

Another preferred electrolyte identified as J containing equal parts by weight of potassium nitrite, ethylene glycol and distilled or de-ionized water has a resistivity between 10 and 16 ohm centimeters at room temperature and less than 600 ohm centimeters at −55 C. Its boiling point is 116° C. to 122° C. and its pH value is between 8 and 9.

A series of etched tatalum foil capacitors were impregnated with the above electrolytes and subjected to a number of tests. These capacitors were designed for electronic circuit applications and were accordingly tested for such application. One group of capacitors rated at 50 microfarads at 50 volts D. C. were subjected to 85° C. life tests. The results of these tests are set forth in Table IV.

TABLE IV

85° C.—50 volt life test—50 mfd. units

| Fill Electrolyte | Hours on Test | Test Temp., °C | C. P. S. | Cap. | Percent D |
|---|---|---|---|---|---|
| K | 0 | 25 | 120 | 65.1 | 4.6 |
|   |   | 25 | 1,000 | 64.0 | 12.9 |
|   |   | 85 | 120 | 83.7 | 23.7 |
|   |   | 85 | 1,000 | 71.0 | 31.5 |
|   | 480 | 25 | 120 | 65.7 | 2.3 |
|   |   | 25 | 1,000 | 63.4 | 9.2 |
|   | 1,104 | 25 | 120 | 67.4 | 3.6 |
|   |   | 25 | 1,000 | 66.1 | 10.3 |
| J | 0 | 25 | 120 | 57.8 | 4.4 |
|   |   | 25 | 1,000 | 56.2 | 13.1 |
|   |   | 85 | 120 | 72.9 | 23.1 |
|   |   | 85 | 1,000 | 61.7 | 27.0 |
|   | 480 | 25 | 120 | 58.7 | 2.7 |
|   |   | 25 | 1,000 | 57.0 | 9.0 |
|   | 1,104 | 25 | 120 | 60.6 | 3.4 |
|   |   | 25 | 1,000 | 59.5 | 8.8 |

Low temperature test of 85° C.—50 volt units (initial)

| Fill Electrolyte | Test Temp., °C. | C. P. S. | Cap. | Percent D | Percent C25 |
|---|---|---|---|---|---|
| K | −58 | 120 | 51.9 | 27.1 | 79.6 |
|   | −57 | 1,000 | 36.5 | 75.0 | 57.1 |
| J | −58 | 120 | 47.5 | 18.9 | 82.3 |
|   | −57 | 1,000 | 36.8 | 58.7 | 65.5 |

In this test, the capacitors were subjected to at least a 6 volt D. C. bias and tested with the concurrent application of either 120 cycle or 1000 cycle A. C. current. Table IV gives the capacity and per cent dissipation factor for these capacitors at the beginning of the test and periodically through the life test up to 1104 hours on test. In all of the tests the anodic foil had been previously formed or oxidized to 50 volts while the cathodic foil had been formed only to 2 volts. The column headed Percent C25 near the bottom of Table IV refers to the per cent of the room temperature, or 25° C., capacitance retained at the indicated lower temperature.

In another series of tests, capacitors having a rating of 30 mfd. at 10 volts were filled with the J electrolyte and subjected to shelf life tests to determine the effect of long idle storage periods on the operating characteristics of the capacitors. The results of these tests are given in Table V.

TABLE V

Shelf life of 10 volt—30 mfd. polar units

| Fill Electrolyte | Hours on Test | Test Temp., °C | C. P. S. | Cap. | Percent D | Shelf Test Temp., °C. |
|---|---|---|---|---|---|---|
| J | 0 | 25 | 120 | 67.0 | 6.2 | 25 |
|   |   | 25 | 1,000 | 63.6 | 25.7 |   |
|   |   | 85 | 120 | 78.0 | 6.0 |   |
|   |   | 85 | 1,000 | 74.1 | 34.5 |   |
|   | 2,160 | 25 | 120 | 63.1 | 8.8 |   |
|   |   | 25 | 1,000 | 60.8 | 27.0 |   |
|   |   | 85 | 120 | 73.5 | 8.3 |   |
|   |   | 85 | 1,000 | 74.2 | 38.5 |   |
|   | 4,176 | 25 | 120 | 60.8 | 6.9 |   |
|   |   | 25 | 1,000 | 56.3 | 26.5 |   |
|   |   | 85 | 120 | 76.6 | 2.6 |   |
|   |   | 85 | 1,000 | 65.1 | 35.0 |   |

Low temperature tests of shelf units (initial)

| Fill Electrolyte | Test Temp., °C. | C. P. S. | Cap. | Percent D | Percent C25 [1] |
|---|---|---|---|---|---|
| J | −56 | 120 | 41.4 | 76.7 | 60.0 |
|   | −56 | 1,000 | 25.1 | 234.0 | 38.9 |
| K | −56 | 120 | 42.0 | 55.4 | 73.5 |
|   | −56 | 1,000 | 26.0 | 219.0 | 44.8 |

[1] Percent C25 means percentage of room temperature capacitance retained at −55° C.

When initially tested at −56° C. these capacitors were found to retain 60% of their room temperature capacitance.

From the results of the above tests, it will be seen that there has been provided a capacitor having good shelf life characteristics both at normal and elevated temperatures as well as relatively high capacitance at sub-normal temperatures. The electrolyte composition shows substantially no chemical change in pH or resistivity with time either with or without applied voltages.

What we claim as new and desired to secure by Letters Patent of the United States is:

1. An electrolytic capacitor comprising tantalum electrodes and an electrolyte consisting essentially, by weight, of from 28 to 35 per cent distilled water and 30 to 43 per cent ethylene glycol, balance potassium nitrite.

2. An electrolytic capacitor comprising tantalum electrodes and an electrolyte consisting essentially, by weight, of from 33 to 35 per cent potassium nitrite, 33 to 35 per cent water and 30 to 34 per cent ethylene glycol.

3. An electrolytic capacitor comprising tantalum electrodes and an electrolyte consisting of equal parts, by weight, of potassium nitrite, ethylene glycol and water.

4. An electrolytic capacitor comprising tantalum electrodes and an electrolyte consisting, by weight, of about 34.8 per cent potassium nitrite, 34.8 per cent distilled water and 30.4 per cent ethylene glycol.

References Cited in the file of this patent

UNITED STATES PATENTS

| 732,631 | Hambuechen | June 30, 1903 |
| 1,022,695 | Morrison | Apr. 9, 1912 |
| 1,998,202 | Robinson | Apr. 16, 1935 |